United States Patent
Liu et al.

(10) Patent No.: US 6,749,904 B1
(45) Date of Patent: Jun. 15, 2004

(54) PATTERNED MAGNETIC MEDIA VIA THERMALLY INDUCED PHASE TRANSITION

(75) Inventors: Connie Chunling Liu, San Jose, CA (US); Li-Ping Wang, Fremont, CA (US); Linda Lijun Zhong, Fremont, CA (US); Jeffery Lee Petrehn, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 214 days.

(21) Appl. No.: 10/138,265

(22) Filed: May 6, 2002

Related U.S. Application Data

(62) Division of application No. 09/593,243, filed on Jun. 14, 2000, now Pat. No. 6,387,530.
(60) Provisional application No. 60/151,029, filed on Aug. 27, 1999.

(51) Int. Cl.$^7$ .................................................. B05D 3/00
(52) U.S. Cl. ........................ 427/552; 427/282; 427/283; 427/287; 427/372.2; 427/516.1; 427/376.3; 427/376.6; 427/383.3; 427/383.5; 427/555; 427/557; 427/595; 427/596; 427/597; 427/599
(58) Field of Search ................ 427/282, 283, 427/287, 372.2, 376.1, 376.3, 376.6, 383.3, 383.5, 552, 555, 557, 595, 596, 597, 599

(56) References Cited

U.S. PATENT DOCUMENTS

| | | |
|---|---|---|
| 4,916,688 A | 4/1990 | Foster et al. |
| 5,429,911 A | 7/1995 | Togawa et al. |
| 5,445,707 A | 8/1995 | Toyama et al. |
| 5,585,140 A | 12/1996 | Brady et al. ................. 427/130 |
| 5,818,323 A | 10/1998 | Maeda et al. ............. 338/32 R |
| 6,029,895 A | 2/2000 | Ito et al. ..................... 235/493 |
| 6,162,532 A | 12/2000 | Black et al. ................. 428/323 |
| 6,168,845 B1 | 1/2001 | Fontana et al. ............ 428/65.5 |
| 6,174,597 B1 | 1/2001 | Yusu et al. .................. 428/332 |

*Primary Examiner*—Bernard Pianalto
(74) *Attorney, Agent, or Firm*—McDermott, Will & Emery

(57) ABSTRACT

High areal storage density, patterned magnetic media comprising a patterned plurality of at least partially crystalline, ferromagnetic particles or grains are provided by means of a simple, economical process wherein a non-magnetic substrate is provided with a layer of an amorphous, paramagnetic or anti-paramagnetic material comprising at least one component, e.g., a metal element, which is ferromagnetic when in at least partially crystalline form, and at least partially crystallizing the at least one component at selected areas of the amorphous layer to form a spaced-apart pattern of at least partially crystallized, ferromagnetic particles or grains of the at least one component, the particles or grains being spaced apart and surrounded by a matrix of the amorphous material. Embodiments include utilizing a focussed or scanned laser source and an amorphous Ni—P layer for forming ferromagnetic Ni particles or grains.

13 Claims, 2 Drawing Sheets

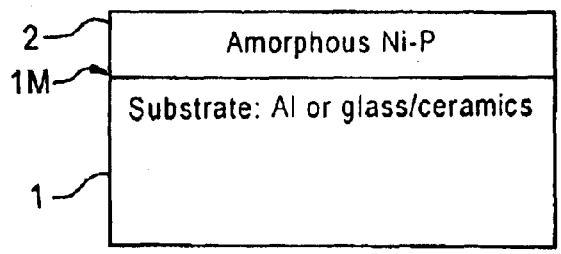
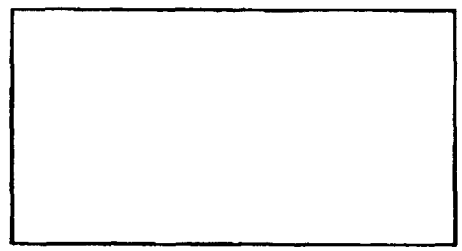
FIG. 1(A)  FIG. 1(B)
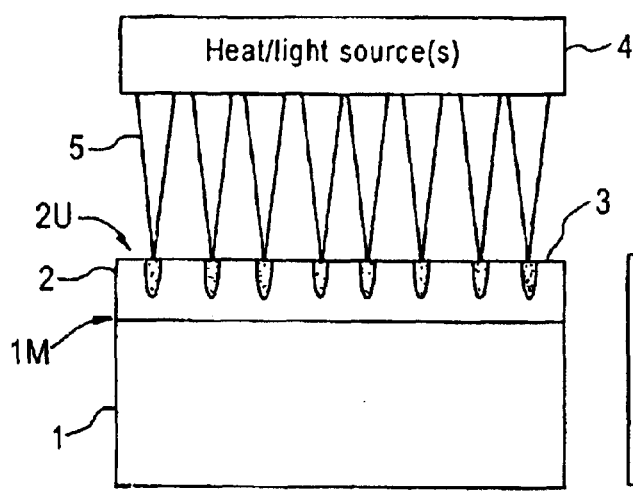
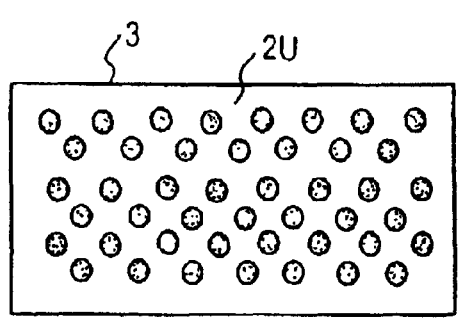
FIG. 2(A)  FIG. 2(B)

PATTERNED MAGNETIC MEDIA VIA THERMALLY INDUCED PHASE TRANSITION

RELATED APPLICATIONS

This application is a divisional of U.S. patent application Ser. No. 09/593,243, filed Jun. 14, 2000, now U.S. Pat. No. 6,387,530, which claims priority from provisional application No. 60/151,029, filed Aug. 27, 1999.

CROSS-REFERENCE TO PROVISIONAL APPLICATION

This application claims priority from U.S. provisional patent application Serial No. 60/151,029 filed Aug. 27, 1999, the entire disclosure of which is incorporated herein by reference.

FIELD OF THE INVENTION

The present invention relates to improved magnetic data/information recording, storage and retrieval media and to a method for manufacturing same. More specifically, the present invention relates to improved, high areal recording and storage density, patterned magnetic media and to a method for manufacturing same which can be readily practiced at a low cost comparable to that of conventional multi-grain magnetic media.

BACKGROUND OF THE INVENTION

Magnetic media are widely utilized in various applications, particularly in the computer industry, and efforts are continually made with the aim or increasing the areal recording density, i.e., the bit density, or bits/unit area, of the magnetic media. Conventional magnetic thin-film media, wherein a fine-grained polycrystalline magnetic alloy layer serves as the active recording medium layer, are typically formed as "perpendicular" or "longitudinal" media, depending upon the direction of magnetization of the grains. In this regard, the "perpendicular" recording media have been found superior to the more common "longitudinal" media in achieving very high bit densities. However, as grain sizes decrease in order to achieve increased recording bit densities, e.g., to somewhere around 20 Gb/in$^2$, effects ansing from thermal instability, such as "super-paramagnetism" are encountered. One proposed solution to the problem of thermal instability with ultra-high recording density magnetic recording media is to increase the crystalline anisotropy, and thus the squareness of the bits, in order to compensate for the smaller grain sizes.

An alternative approach, however, to the formation of very high bit density magnetic recording media, is one which delays the onset of thermal instability problems by storing the data/information in isolated magnetic particles. In contrast with conventional polycrystalline-based magnetic media where thousands of very small-sized grains are required for storing a single data bit, so-called "patterned" magnetic media utilize only a single, relatively large-sized particle for storage of a single data bit. For example, in "patterned" media, the single particles (i.e., the basic storage unit) are more than about ten times larger than the thermally unstable grains of conventional very high recording density magnetic media, in principle permitting storage densities of about 100 Gb/in$^2$ and above.

Analogous to the situation with conventional polycrystalline thin film magnetic media, both "longitudinal" and "perpendicular" types of patterned magnetic media have been developed, depending upon whether the magnetization direction of the particles is parallel or perpendicular to the media surface. When fabricated in disk form, such "patterned" media are readily adapted for use in conventional hard drives, with most of the drive design features remaining the same. Thus, hard-drive based "patterned" media technology would comprise a spinning disk with a slider head flying above it in closely-spaced relation thereto, with read sensors or a read/write head that magnetizes and/or detects the magnetic fields emanating from the magnetic particles.

To date, several approaches have been utilized for the formation of "patterned" magnetic media, which approaches can be classified into two major categories, i.e., (1) mechanical or mechanical replication; and (2) lithographic patterning.

According to the first approach, as exemplified by the Atomic Force Microscopy ("AFM") approach of IBM (B. Terris et al., Data Storage, August 1998, pp. 21–26), a sharp tip is utilized for scanning extremely close to the surface of a storage medium. The tip is located at the end of a flexible cantilever, which deflects in response to changes in the force imposed on the tip during scanning. The force may arise from a variety of effects, including, inter alia, magnetic force. To date, two types of AFM drives have been demonstrated, i.e., write-once/read-only and read-only. The former type of AFM drive, which provides write-once/read-only capability, utilizes a heated AFM tip for writing once by forming small indentations or pits in the surface of a substrate. e.g., of polycarbonate. Data is read by using the AFM tip to scan the thus-indented surface and sensing the changes in the force imposed on the AFM tip due to the presence of the indentations.

The latter type of AFM drive functions in a read-only mode, and data is initially written in the form of indentations (pits) which are created in the surface of a SiO$_2$ master by means of an electron beam. The data, in the form of the indentations, is then transferred, by replication, to a photopolymer-coated glass substrate, which photopolymer is cured by exposure to ultra-violet (UV) radiation to thereby form a surface topography representing the data. The data is then read from the cured photopolymer surface by scanning with the AFM tip to sense the changes in force thereat due to the indentations.

According to the second, lithographic approach, thin film processes such as are utilized in the fabrication of semiconductor integrated circuits including micro-sized features are adapted for making high aspect ratio, single column/bit, perpendicularly patterned media. According to one particular approach (M. Todorovic et al., Data Storage, May 1999, pp. 17–20), designed to increase coercivity, hence stability, of the individual magnetic columns, electroplated nickel (Ni) is utilized for forming the columns, and gallium arsenide (GaAs) and alumina (Al$_2$O$_3$) are employed as embedding media for the columns. The fabrication process starts with an electrically conductive GaAs substrate, on which thin layers of aluminum arsenide (AlAs) and GaAs are successively deposited. Scanning electron-beam lithography is then utilized to define the magnet patterns on a resin-coated sample. The patterns in the e-beam exposed resin are developed utilizing an appropriate solvent system and then transferred, as by chemically-assisted ion beam etching ("CAIBE"), into the AlAs/GaAs layers. After pattern definition, the AlAs layer is converted into Al$_2$O$_3$ by wet thermal oxidation. The thus-produced patterned layer acts as a mask for additional etching for extending the pattern of depressions perpendicularly into the GaAs substrate. The etched depressions in the Al$_2$O$_3$ substrate are then filled with electroplated Ni. Overplated Ni "mushrooms" are then removed, as by polishing, to create a smooth surface for accommodating slider contact therewith.

Thus, the overall process sequence for forming such media requires successive, diverse technology steps for (1) MBE growth and mask deposition; (2) electron beam lithography; (3) chemically assisted ion beam etching; (4) wet thermal oxidation; (5) chemically assisted ion beam etching; and (6) electroplating and polishing. The result is a complex and time-consuming fabrication process. Moreover, each of the above-described approaches for patterned media manufacture typically involves substantial capital investment for the process equipment, which together with the inherent process complexity, render them too costly for use in high product throughput, magnetic disk media manufacture.

Accordingly, there exists a need for improved, high bit density, patterned magnetic data/information recording, storage, and retrieval media, e.g., in hard disk form, and a method for manufacturing same, which can be implemented at a cost compatible with that of conventional, multi-grain disk media by primarily utilizing current media manufacturing methodologies, technologies, and instrumentalities.

The present invention, therefore, addresses and solves problems attendant upon patterned magnetic media manufacture, and affords rapid, cost-effective fabrication of high bit density, patterned magnetic media, e.g., in the form of hard disks, while providing substantially full compatibility with all mechanical and electrical aspects of conventional hard disk technology. Moreover, the patterned magnetic media of the present invention can be simply and reliably manufactured largely by means of conventional manufacturing techniques.

DISCLOSURE OF THE INVENTION

An advantage of the present invention is an improved method of manufacturing a high areal storage density, patterned magnetic data/information recording, storage and retrieval medium.

Another advantage of the present invention is an improved, high areal storage density, patterned magnetic data/information recording, storage and retrieval medium.

Additional advantages, aspects, and other features of the present invention will be set forth in the description which follows and in pant will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in pant by a method of manufacturing a high areal storage density, patterned magnetic recording, storage and retrieval medium, which method comprises the sequential steps of:

(a) providing a non-magnetic substrate having a surface for layer formation thereon;

(b) forming a layer of an amorphous, paramagnetic or anti-paramagnetic material on the substrate surface, the layer of amorphous, paramagnetic or anti-paramagnetic material comprising at least one component which is ferromagnetic when in at least partially crystalline form; and (c) at least partially crystallizing the at least one component of the layer of amorphous, paramagnetic or anti-paramagnetic material at selected locations thereof to thereby form a pattern of at least partially crystalline, ferromagnetic particles or grains of the at least one component of the layer, the ferromagnetic grains being spaced apart and surrounded by a matrix of the amorphous, paramagnetic or anti-paramagnetic material.

According to embodiments of the present invention, step (b) comprises forming as the amorphous, paramagnetic or anti-paramagnetic layer a metal glass layer including at least one metal element which is ferromagnetic when in at least partially crystallized form, e.g., the metal glass layer comprises at least one of iron (Fe), nickel (Ni), and cobalt (Co); and step (c) comprises at least partially crystallizing the at least one component of the amorphous, paramagnetic or anti-paramagnetic layer by increasing the temperature thereof at the selected locations, e.g., increasing the temperature at the selected locations up to at least a phase transition temperature of the at least one component.

According to further embodiments of the present invention, step (c) comprises increasing the temperature of the amorphous, paramagnetic or anti-paramagnetic layer to up to the melting point of the at least one component thereof, e.g., by irradiating the layer with photons or energetic particles at the selected locations, such as by photon irradiation utilizing a focussed laser or a focussed, high-intensity lamp as a photon source, or by utilizing an electron beam source as a source of energetic particles.

According to still further embodiments of the present invention, step (c) comprises scanning the photons or energetic particles across the surface of tile amorphous, paramagnetic or anti-paramagnetic layer to impinge at the selected locations thereof, or irradiating the photons or energetic particles through an aperture-patterned mask having a plurality of openings therethrough with predetermined dimensions corresponding to a preselected size of the at least partially crystalline, ferromagnetic particles or grains; the pattern being two-dimensional and defining a checkerboard or other shape pattern of the at least partially crystallized, ferromagnetic particles or grains surrounded by the amorphous, paramagnetic or anti-paramagnetic layer.

According to further exemplary embodiments of the present invention:

step (a) comprises providing a non-magnetic, disk-shaped substrate comprising a material selected from the group consisting of metals, metal alloys, aluminum (Al), Al-based alloys, ceramics, glasses, polymers, and composites thereof;

step (b) comprises forming a layer of amorphous nickel-phosphorus (Ni—P) as the amorphous, paramagnetic or anti-paramagnetic material; and step (c) comprises increasing the temperature of the amorphous Ni—P layer at the selected locations to a temperature, e.g., up to about 350° C., for an interval sufficient to form and at least partially crystallize ferromagnetic Ni particles or grains thereat.

According to another aspect of the present invention, a high areal storage density, patterned magnetic data/information recording, storage and retrieval medium comprises:

a non-magnetic substrate having a surface: and a patterned magnetic layer on the substrate surface, the patterned magnetic layer comprising a plurality of spaced-apart, at least partially crystalline, ferromagnetic particles or grains surrounded by a matrix of an amorphous, paramagnetic or anti-paramagnetic material.

According to embodiments of the present invention, the non-magnetic substrate comprises a material selected from the group consisting of metals, metal alloys, aluminum (Al), Al-based alloys, ceramics, glasses, polymers, and composites thereof; and the patterned magnetic layer comprises a plurality of spaced-apart, at least partially crystalline, ferromagnetic particles or grains comprising at least one metal element which is ferromagnetic when in at least partially crystalline form, selected from the group of metal elements consisting of iron (Fe), nickel (Ni), and cobalt (Co), the particles or grains being surrounded by a matrix comprised of a metal glass paramagnetic or anti-paramagnetic layer including at least one of the aforementioned metal elements.

According to further embodiments of the present invention, the non-magnetic substrate is disk-shaped; and the patterned magnetic layer comprises a plurality of spaced-apart, at least partially crystalline, ferromagnetic Ni particles or grains surrounded by a matrix of amorphous Ni—P.

According to still further embodiments of the present invention, the patterned magnetic layer comprises a two-dimensional, checkerboard pattern of at least partially crystalline, ferromagnetic particles or grains and a surrounding matrix of amorphous, paramagnetic or anti-paramagnetic material; and the magnetic medium further comprises a protective overcoat layer over the patterned magnetic layer and a lubricant topcoat layer over the protective overcoat layer.

According to yet another aspect of the present invention, a magnetic medium comprises:

a non-magnetic substrate including a surface; and patterned magnetic means formed within a layer of amorphous material on the substrate surface.

According to an embodiment of the present invention, the patterned magnetic layer means comprises a plurality of spaced-apart, at least partially crystalline, ferromagnetic particles or grains surrounded by a matrix of amorphous, paramagnetic or anti-paramagnetic material comprising at least one component which is ferromagnetic when in at least partially crystalline form.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not limitative.

BRIEF DESCRIPTION OF THE DRAWINGS

The following detailed description of an embodiment of the invention can best be understood when read in conjunction with the following drawings, wherein:

FIGS. 1(A) and 1(B), respectively, show cross-sectional and plan views of a Ni—P plated, Al-based substrate prior to patterned Ni crystallization processing;

FIGS. 2(A) and 2(B), respectively, show cross-sectional and plan views of the Ni—P plated, Al-based substrate subsequent to irradiation with a focussed heat source for inducing patterned Ni crystallization;

DESCRIPTION OF THE INVENTION

Figure 3A:
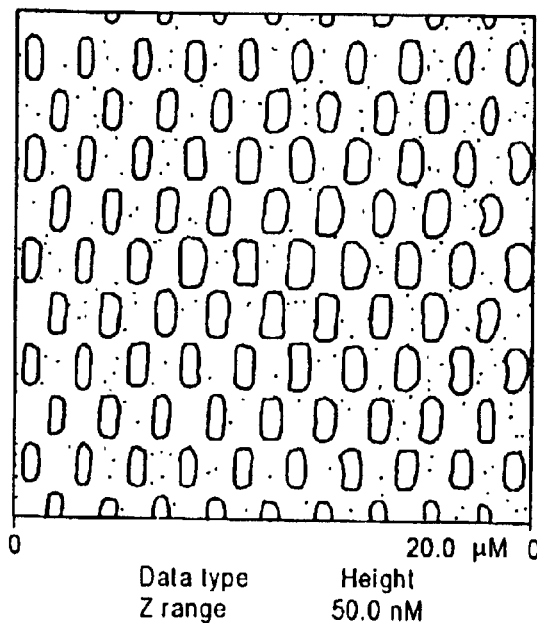
FIGS. 3(A) and 3(B) are drawings of image patterns of Ni—P plated, Al-based substrates after high power laser irradiation to temperatures close to the Ni—P melting point, obtained via Atomic Force Microscope (AFM) and Magnetic Force Microscopy (MFM), respectively.

The present invention has, as a principal aim, provision of a simple, convenient, and reliable method of forming magnetic patterns on or within substrate surfaces, for use in manufacturing high areal density data/information recording, storage and retrieval media suitable for operation with conventional disk drive technology, which method relies largely upon techniques, methodologies, and instrumentalities currently utilized in the manufacture of magnetic media. The present invention also has, as a principal aim, provision of high areal density, patterned magnetic data/information recording, storage and retrieval media, e.g., hard disks, which can be manufactured at a cost compatible with that of conventional, multi-grain magnetic media.

An essential feature of the patterned magnetic media of the present invention, and manufacturing method therefor, is the formation on a surface of a suitable substrate, such as a non-magnetic disk, of a pattern of spaced-apart, individual ferromagnetic particles or grains surrounded by a matrix comprised of an amorphous, paramagnetic or anti-paramagnetic material, whereby minimal magnetic coupling occurs between closely-spaced, e.g., adjacent, particles or grains. The ferromagnetic particles or grains are arranged in a regular, i.e., orderly, pattern for facilitating data recording, storage, and retrieval. As indicated supra, patterned magnetic media of the type contemplated herein, when fabricated to include appropriately dimensioned magnetic particles or grains with no, or very little inter-grain coupling, can exhibit very high areal recording densities, e.g., on the order of about 100 $Gb/in^2$ and greater.

The present invention also avoids the drawbacks and disadvantages of earlier patterned magnetic recording media resulting from the use of technologically diverse, complicated, and capital-intensive manufacturing procedures, equipment, and methodology. In contrast with such prior fabrication methodologies, the present invention can be practiced by utilizing materials, techniques, and methodologies commonly and currently employed in the manufacture of conventional multi-grain magnetic recording media.

According to a first step of the present invention, as shown in FIGS. 1(A) and 1(B) in cross-sectional and plan view, respectively, a conventionally utilized substrate 1, e.g., a disk-shaped substrate comprised of a non-magnetic material selected from among metals, metal alloys, aluminum (Al), Al-based alloys, glasses, ceramics, polymers, and all manner of composites thereof, is initially provided, and an appropriate thickness film or layer 2 of an amorphous, paramagnetic or anti-paramagnetic material is formed on a major surface 1M thereof, as by a suitable amorphous thin film deposition technique (e.g., chemical vapor deposition (CVD); plasma enhanced CVD (PECVD); physical vapor deposition (PVD), including sputtering, vacuum evaporation, ion plating, etc.; electroless plating; and electroplating). An essential feature of the present invention is that the amorphous, paramagnetic or anti-paramagnetic material be comprised of at least one component, which when present in at least partially crystallized form, exhibits ferromagnetism. Suitable materials for such amorphous, paramagnetic or anti-paramagnetic layer include, inter alia, metallic glasses comprised of one or more metallic elements which exhibit ferromagnetism when in at least partially crystallized form, notably iron (Fe), nickel (Ni), and cobalt (Co).

Referring now to FIGS. 2(A) and 2(B), which respectively show cross-sectional and plan views, according to a second step of the present invention, a plurality of areas arranged in a preselected pattern on the surface of the layer or film 2 of amorphous, paramagnetic or anti-paramagnetic material are selectively converted into individual ferromagnetic particles or grains 3, as for example, by a phase transition involving local melting and subsequent crystallization. Such phase transition by melting/crystallization can be readily achieved selectively and locally by means of a variety of processes and sources 4 for locally applying thermal energy beams 5 to the upper surface 2U of layer 2, such as, for example, by laser heating, high-intensity radiant lamp heating, infra-red heating, kinetic energy transfer by energetic particle bombardment, e.g., electron-beam heating, etc. The local heating is performed by selectively applying a suitable source 4 intensity for a duration sufficient to achieve a desired temperature within a desired depth below upper surface 2U of a patterned plurality of local areas of the amorphous, paramagnetic or anti-paramagnetic layer 2. Pattern definition can be accomplished by various techniques, including, inter alia, scanning of focussed photon irradiation or energetic particle beams over the surface of the amorphous layer or passage through an apertured mask overlying the surface of the amorphous layer, the mask including a pattern of openings corresponding to the desired pattern of magnetic particles or grains 3 to be formed in the amorphous layer. In addition to the above-described technique wherein localized heating by photon irradiation is accomplished by means of image projection, other photon irradiation techniques may be employed to similar effect, including, for example, interference lithography, contact lithography, and spot scanning. Similarly, energetic particle bombardment can be accomplished by means of, for example, scanning and mask imaging techniques.

According to the invention, complete crystallization of the selectively photon irradiated or energetic particle bombarded areas is not required in order to form functional ferromagnetic particles or grains 3. As a consequence, it is not necessary that the selective, locally photon irradiated or energetic particle bombarded areas reach temperatures as high as the melting point of the amorphous material during irradiation or bombardment, and local heating to temperatures below the melting point can, depending upon the particular material of the amorphous layer, result in formation of ferromagnetic particles or grains 3 capable of recording and reading-out data/information stored therein. Given the disclosure and objectives of the present invention, determination of suitable photon irradiation or energetic particle bombardment conditions can be readily determined and selected by one of ordinary skill in the art for use with a particular amorphous, paramagnetic or anti-paramagnetic material. For example, lasers suitable for use as a photon irradiation source with metallic glass materials according to the present invention can have wavelengths ranging from the deep ultra-violet ("DUV") to the ultra-violet ("UV") to the visible and even infra-red ("IR") regions of the electromagnetic spectrum, with the shorter wavelength DUV-UV regions being preferable from the point of view of higher pattern resolution. The lasers may also be pulsed, with pulse durations ranging from below about one nanosecond ($<10^{-9}$ sec.), to about one microsecond ($10^{-6}$ sec.), typically about 3–50 nanoseconds.

EXAMPLE

Figure 3B:
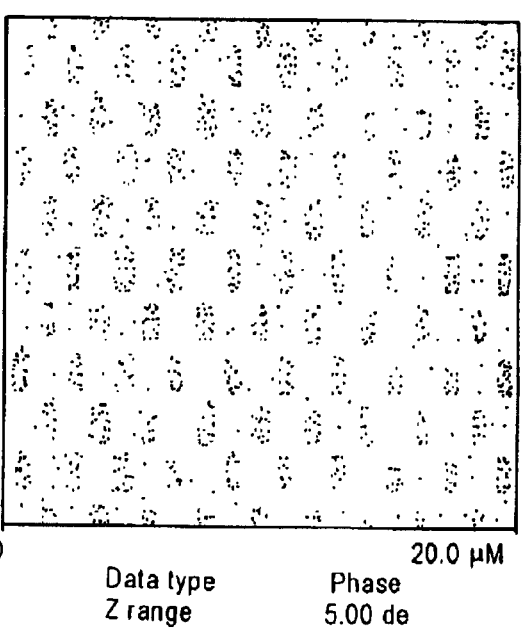
Figure 4A:
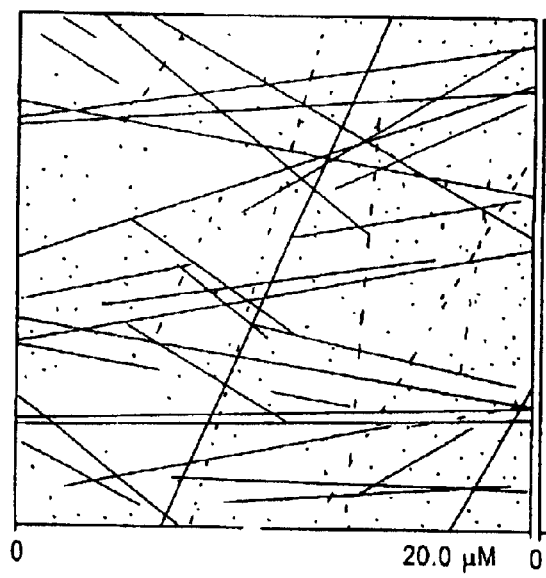
FIGS. 4(A) and 4(B) are drawings of image patterns of Ni—P plated, Al-based substrates after low power laser irradiation to temperatures below the Ni—P melting point, obtained via AFM and MFM, respectively.
Figure 4B:
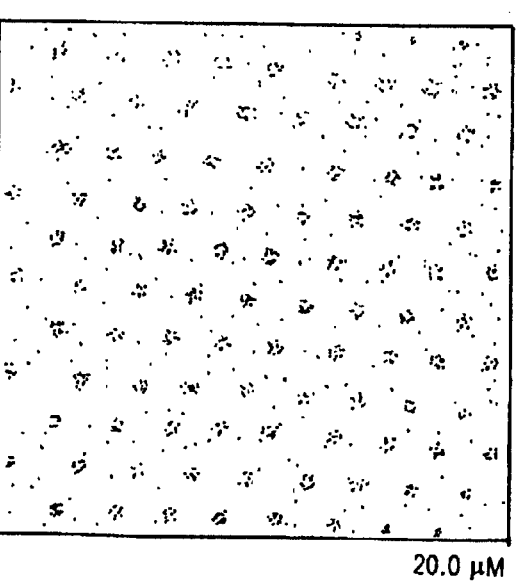

From about 5 to about 15 $\mu$m thick layers 2 of amorphous, paramagnetic Ni—P were deposited on Al-based disk substrates 1 by conventional plating or vacuum deposition techniques (e.g., electroless plating, electroplating, sputtering) and given a smooth (i.e., Ra<5 Å) upper surface 2U by conventional polishing techniques, to accommodate a low flying height slider (i.e., <1 $\mu$inch). Pulsed laser DUV to UV photon irradiation sources 4 (pulse width 3–50 nanoseconds) were utilized for focussing and projecting a 2-dimensional image in the form of a checkerboard pattern with a 1 $\mu$m×2 $\mu$m unit cell size onto the upper surface 2U of the amorphous Ni—P layer 2. FIGS. 3(A) and 3(B) are drawings respectively of Atomic Force Microscopy (AFM) and Magnetic Force Microscopy (MFM) images obtained when the laser output power and duration were selected to provide the pattern of locally heated areas with a temperature close to the crystallization phase transition temperature of amorphous Ni—P, i.e., about 300–350° C. FIGS. 4(A) and 4(B) are analogous to FIGS. 3(A) and 3(B), but illustrate the case where the laser output power was reduced such that the maximum temperature of the locally heated areas achieved during laser irradiation was below the melting point of amorphous Ni—P in the former i.e., at the higher laser output power, both the AFM and MFM images clearly show a checkerboard pattern of ferromagnetic particles or grains corresponding to the laser irradiation pattern, whereas, in the later instance, i.e., with reduced laser output power, the checkerboard pattern indicating formation of ferromagnetic particles or grains is clearly visible only in the MFM image. A grater volume change of the irradiated areas due to crystallization into ferromagnetic Ni particles or graims was observed when the higher rather than the lower laser power output was utilized, and crystallization at the higher laser output power occurred to a depth of about 50 Å below upper surface 2U of layer 2.

Thus, it is evident that the inventive methodology, which is largely based upon conventional magnetic media manufacturing technology, can be effectively utilized for facilitating rapid, convenient, and technologically simplified fabrication of patterned magnetic media at product throughput rates consistent with the requirements of low cost automated magnetic media manufacture. Moreover, while the Example illustrates an embodiment wherein a checkerboard type two-dimensional pattern is formed, the invention is not limited to formation of any particular geometric pattern or arrangement of magnetic particles, and the formation of patterns of other shapes, designs, or arrangements is within the ambit of the present invention.

In the previous description, numerous specific details are set forth, such as specific materials, structures, processes, etc., in order to provide a better understanding of the present invention. However, the present invention can be practiced without resorting to the details specifically set forth. In other instances, well-known processing techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concepts as expressed herein.

What is claimed is:

1. A method of manufacturing a high areal storage density, patterned magnetic data/information recording, storage and retrieval medium, which method comprises the sequential steps of:

(a) providing a non-magnetic substrate having a surface for layer formation thereon;

(b) forming a layer of an amorphous, paramagnetic or anti-paramagnetic material on said substrate surface, said layer of amorphous, paramagnetic or anti-paramagnetic material comprising at least one component which is ferromagnetic when in at least partially crystallized form; and (c) at least partially crystallizing said at least one component of said layer of amorphous, paramagnetic or anti-paramagnetic material at selected locations thereof to thereby form a pattern of at least partially crystallized, ferromagnetic particles or grains of said at least one component of said layer, said ferromagnetic particles or grains being spaced apart and surrounded by a matrix of said amorphous, paramagnetic or anti-paramagnetic material.

2. The method according to claim 1, wherein:

step (b) comprises forming as said amorphous, paramagnetic or anti-paramagnetic layer a metal glass layer including at least one metal element which is ferromagnetic when in at least partially crystallized form.

3. The method according to claim 2, wherein:

step (b) comprises forming a metal glass layer comprising at least one metal element selected from the group consisting of iron (Fe), nickel (Ni), cobalt (Co) as said amorphous, paramagnetic or anti-paramagnetic layer.

4. The method according to claim 1, wherein:

step (c) comprises at least partially crystallizing said at least one component of said amorphous, paramagnetic or anti-paramagnetic layer by increasing the temperature of said layer at said selected locations.

5. The method according to claim 4, wherein:

step (c) comprises increasing the temperature of said layer at said selected locations up to at least a phase transition temperature of said at least one component.

6. The method according to claim 5, wherein:

step (c) comprises increasing the temperature of said layer at said selected locations up to the melting point of said at least one component thereof.

7. The method according to claim 4, wherein:

step (c) comprises increasing the temperature of said layer at said selected locations by irradiation with photons or energetic particles.

8. The method according to claim 7, wherein:

step (c) comprises photon irradiation utilizing a focussed laser or a focussed, high-intensity lamp as a source of photons.

9. The method according to claim 7, wherein:

step (c) comprises utilizing an electron beam as a source of energetic particles.

10. The method according to claim 7, wherein:

step (c) comprises scanning said photons or said energetic particles across the surface of said layer to impinge thereupon at said selected locations, or irradiating said photons or energetic particles through an aperture-patterned mask having a plurality of openings extending therethrough with predetermined dimensions corresponding to a preselected size of said at least partially crystallized, ferromagnetic particles or grains.

11. The method according to claim 7, wherein:

step (c) comprises forming a two-dimensional pattern.

12. The method according to claim 11, wherein:

step (c) comprises forming a checkerboard pattern.

13. The method according to claim 1, wherein;

step (a) comprises providing a non-magnetic, disk-shaped substrate comprising a material selected from the group consisting of: metals, metal alloys, aluminum (Al), Al-based alloys, ceramics, glasses, polymers, and composites thereof;

step (b) comprises forming a layer of amorphous nickel-phosphorus (Ni—P) as said amorphous, paramagnetic or anti-paramagnetic material; and step (c) comprises increasing the temperature of said amorphous Ni—P layer at said selected locations to up to about 350° C. for an interval sufficient to form and at least partially crystallize ferromagnetic Ni particles or grains thereat.

* * * * *